RECEIVERS FOR SUPPRESSED-CARRIER SINGLE-SIDEBAND TRANSMISSIONS OF BINARY-PULSE SIGNALS

Filed Dec. 4, 1962 4 Sheets-Sheet 1

INVENTORS
ALAN J. H. OXFORD,
RICHARD T. A. STANDFORD
JAMES A. GALLOWAY
BY William E.P. Boughy
ATTORNEY INVENTORS
ALAN J. H. OXFORD
RICHARD T. A. STANDFORD
JAMES A. GALLOWAY
BY
William E.P. Bayly
ATTORNEY INVENTORS
ALAN J. OXFORD
RICHARD T. A. STANDFORD
JAMES A. GALLOWAY
BY
William S. P. Dayly
ATTORNEY INVENTORS
ALAN J. OXFORD
RICHARD T. A. STANDFORD
JAMES A. GALLOWAY
BY
William S. P. Bayly
ATTORNEY

United States Patent Office 3,199,030
Patented Aug. 3, 1965

3,199,030

RECEIVERS FOR SUPPRESSED-CARRIER SINGLE-SIDEBAND TRANSMISSIONS OF BINARY-PULSE SIGNALS

Alan John Henry Oxford, Ampfield, Richard Thomas Albert Standford, Fareham, and James Alexander Galloway, North End, Portsmouth, England, assignors to The Plessey Company Limited, Ilford, England, a British company Filed Dec. 4, 1962, Ser. No. 243,201
Claims priority, application Great Britain, Dec. 7, 1961, 43,886/61
8 Claims. (Cl. 325—329)

Figure 1:
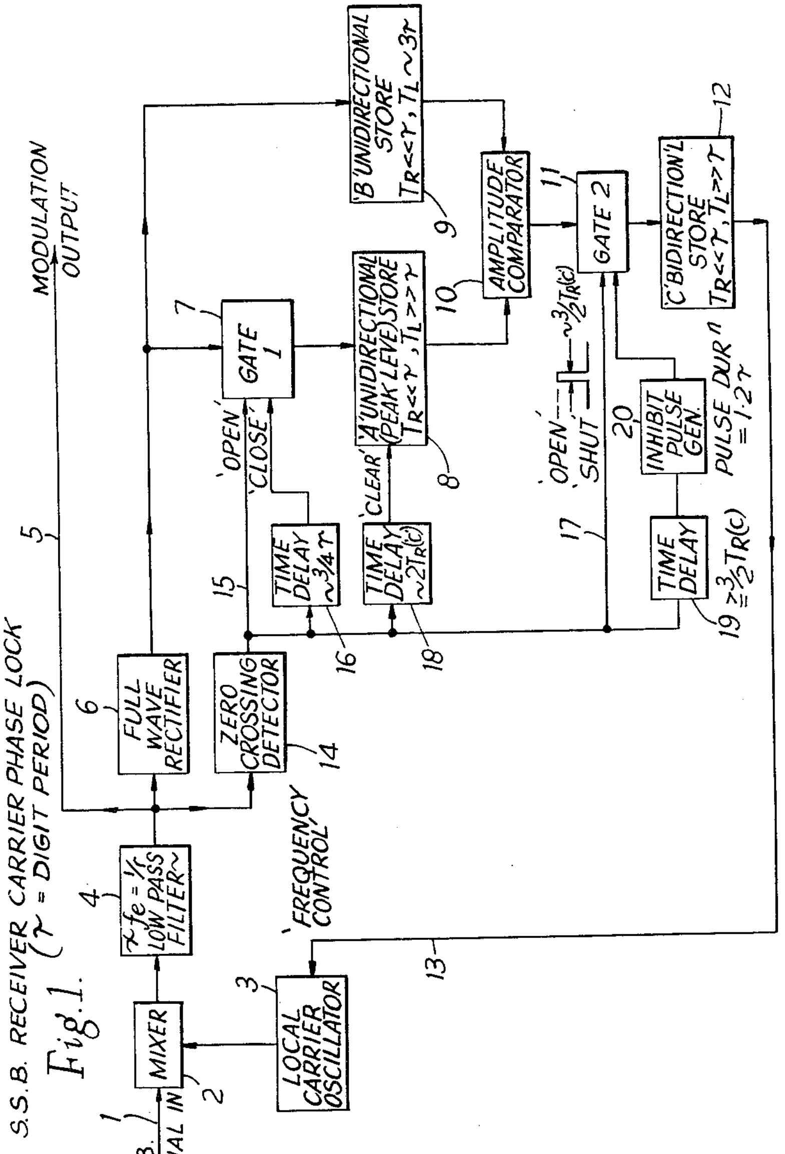

In wireless and telecommunication systems, more particularly when working at high and very high to ultra-high frequencies, the use of single-sideband transmission in which the carrier itself is not transmitted, is well known to offer advantages in economy both of power and of wave-band width. On the other hand a very high accuracy in the reinsertion of the carrier frequency at the receiver end is required both as regards phase and frequency in order to prevent the transmission from becoming unintelligible, and the present invention has for an object to provide improved carrier reinsertion means enabling the carrier to be automatically reinserted with high accuracy as to both frequency and phase so as to permit the use of a single-sideband receiver for the reception of a continuous transmission of signals in digital code and particularly in binary code.

In a detailed study of the effects of phase displacements between the suppressed carrier and the reinserted carrier upon the receiver-output digital waveform, we have found that such displacement will distort the digital output waveform by forming a peak of increased amplitude, hereinafter called "ear," either at the beginning or at the end of the waveform between two zero crossings according to whether the phase is displaced in one direction or the other. When the usual bandwidth restriction applies, this displacement is still ascertainable in the case of a waveform produced by two or more successive signal pulses of the same sign.

The present invention is based on this discovery and in its broadest aspect consists in utilising the appearance and position of the ear, between successive zero crossings, or at the two sides of a zero crossing, of the output waveform, for the automatic adjustment of the frequency of the oscillator utilised for producing the reinserted carrier, thus achieving at the same time an automatic adjustment of the phase of the reinserted carrier. This method enables single-sideband transmission to be successfully used for transmission of digital information.

According to a more specific aspect of the invention, a peak-voltage sample taken over a short period of time and including the region in which the ear is liable to appear when the phase displacement is such as to produce an ear near the beginning of the waveform, is stored and then compared, at a time controlled by the next zero-crossing of the waveform, with another peak-voltage sample which is taken continuously and stored in a store having a relatively short decay time so that at the time of comparison the influence upon this store of an ear appearing at the beginning of the waveform between two zero crossings is negligible or small compared with the influence of an ear appearing at the end of this waveform, the difference voltage obtained by the comparison being utilised for the automatic adjustment of the frequency of the local oscillator producing the reinserted carrier. To enable both positive-going and negative-going waveforms to be utilised for the adjustment, fullwave rectification is applied to the output digital waveform submitted to the sampling.

Since, when the usual band width restriction applies, only a single maximum will appear in each pulse period of a waveform, the system as so far decsribed would produce a signal indicating "zero error" for each waveform consisting of a single pulse, although in fact a phase error may still persist between the local oscillator output and the suppressed carrier. According to a subsidiary feature of the invention this potentially false information is preferably suppressed by a device which prevents transmission of the comparator output to the final store during a period following the end of the first pulse period after each zero crossing of the unrectified waveform.

In an alternative system according to the invention the position of the ears in the individual waveforms between zero crossings is determined by direct comparison, preferably algebraic subtraction, of simultaneously occurring momentary values of two replicas of the waveform which are delayed relative to each other by the length of a single signal period thus comparing the first maximum of each waveform with the last maximum of the last preceding waveform.

Figure 2:
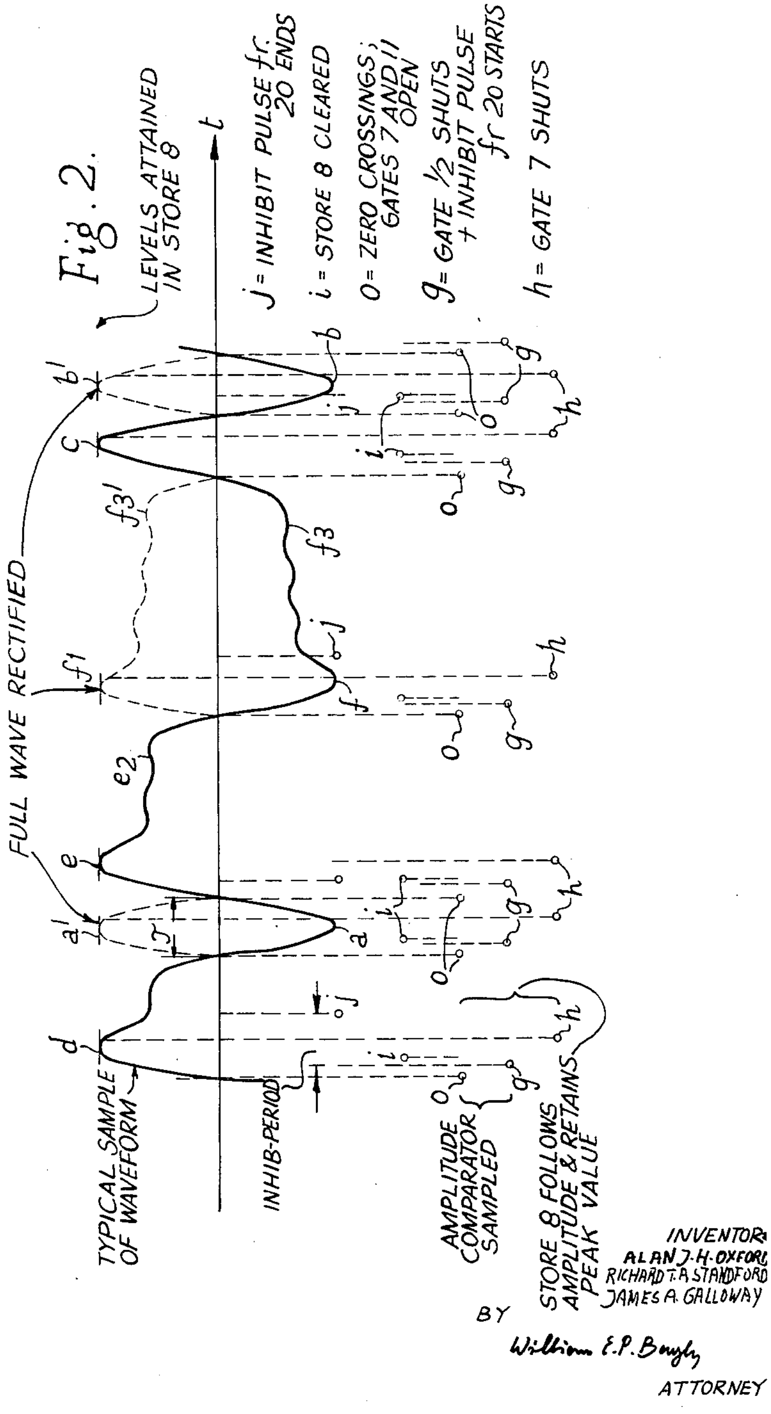
Figure 3:
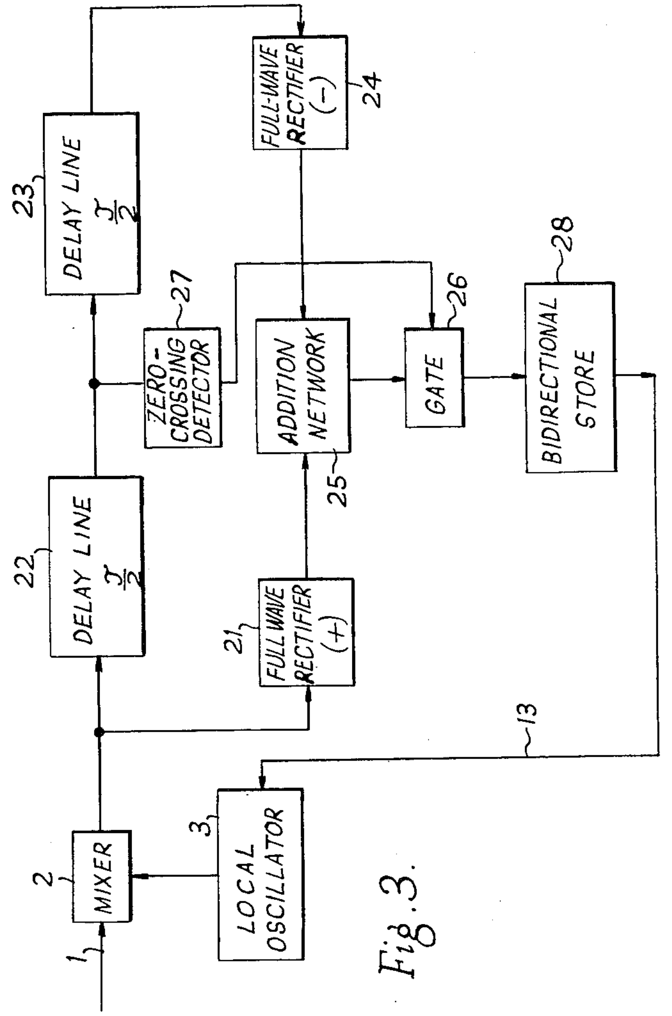
Figure 4:
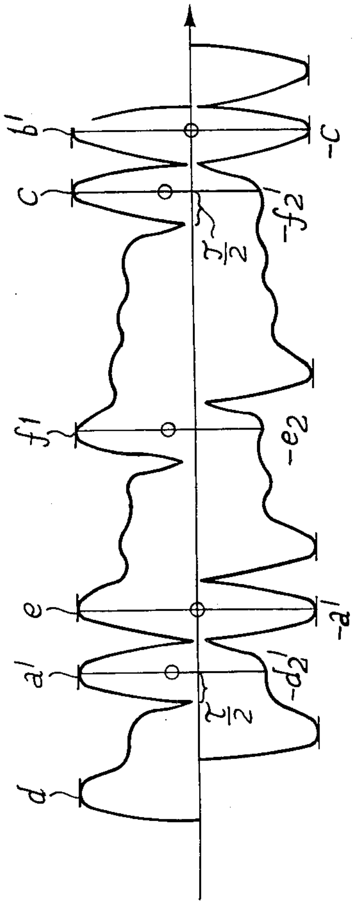

In order that the invention may be more readily understood, two embodiments of a single-sideband receiver equipped with a carrier phase lock according to the present invention will now be described with reference to the accompanying drawings, in which FIGURE 1 is a block type circuit diagram of one embodiment, FIGURE 2 is a typical waveform sample of the reconstituted waveform when the reinserted carrier has a phase error compared with the original carrier of the transmitter, FIGURE 3 is a block-type circuit diagram of an embodiment employing the alternative system, while FIGURE 4 shows the rectified waveform of FIGURE 2 together with a delayed rectified waveform of opposite polarity, the sampling points and difference voltages being also indicated.

Referring now first to FIGURE 1, a single-sideband signal which contains no carrier is introduced at 1 into a mixer 2, where it is mixed with the output of a local oscillator 3 serving to produce an output which is to replace the omitted carrier of the received signal. After passage through a low-pass filter 4, which serves to suppress the unwanted products of mixing and residues of the input signals, the modulation output is available and passed on for utilisation at line 5. Assuming now that the reinserted carrier frequency shows a very slight difference from the original transmitter carrier frequency, there is a slowly fluctuating phase difference between the two frequencies, and FIGURE 2 shows, drawn in a full line, the digital output appearing in output line 5 in the case of a phase error about 30°. The illustrated curve represents an output which might be written as

++−+++−−−−+−

While in the case of a single digit of one polarity, due to the waveband limitation, the output curve of FIGURE 2 shows only a single maximum, as at points $a$ and $b$ (negative) and $c$ (positive), a maximum will be located distinctly at the initial portion of the waveform when there are two or more consecutive pulses of the same polarity as in the cases of the maxima $d$, $e$ (positive) and $f$ (negative). It will be understood that if the phase of the reinserted carrier were displaced in the opposite direction, these peak maxima or ears would occur towards the end instead of towards the beginning of each of the waveform excursions hereinafter called waveform representing two or more consecutive digits of the same polarity. In order to be able to utilise not only the positive maxima $d$ and $e$ but also negative maxima such as maximum $f$ for the automatic adjustment of the oscillator frequency, the output to be sampled is subjected to fullwave rectification, causing the negative-going parts of the curve to be represented by similar positive-going parts as shown in broken lines in the diagram and including additional positive maxima at $a^1$ corresponding to $a$, at $f^1$ corresponding to $f$, and at $b^1$ corresponding to $b$. This rectification is effected by a fullwave rectifier 6 in FIGURE 1 connected to the output of filter 4. In order to be able to discern whether the ear appears at the beginning or at the end of a waveform and to measure the voltage difference between the ear voltage and the voltage at the other end of each waveform, a maximum-voltage sample is gated by a first gate 7 to be taken during a limited period commencing with a zero crossing and terminating approximately three quarters of the length of a digit period $\tau$ and is fed to a unidirectional peak-level store 8, of which the charging time $\tau_R$ is short compared with $\tau$ while its decay time is sufficiently long compared with $\tau$ to ensure that the voltage level is still available substantially unaltered at the end of the waveform even if a considerable number of pulses of the same polarity follow in succession. The voltage stored in store 8 is compared with that of a second unidirectional store 9, which is fed direct from the fullwave rectifier 6 and which, while also having a short charging-up time, has a comparatively short decay time, so that even after two successive pulses of the same polarity it will, at the next zero crossing, be relatively little influenced by an ear occurring at the beginning of the waveform. The amplitudes stored in the unidirectional stores 8 and 9 are continuously compared in an amplitude comparator 10, the reading of which is transimitted, after the next zero crossing, by a second gate 11 to a bi-directional store 12, which again has a short charging-up time and a long decay time, and the output of which is fed via a line 13 to the automatic frequency-control device of the local-carrier oscillator 3. To effect triggering of the gates in accordance with zero crossings, a zero-crossing detector 14 is also fed from the output of the low-pass filter 4 before rectification. The output pulses from the zero-crossing detector are fed by a line 15 direct to the gate 7 and will open that gate to begin charging of the peak level store 8 sampling the voltage near the beginning of each waveform, and are also fed with a time delay of approximately $\frac{3}{4}\tau$ produced by a device 16 to the same gate for terminating the receptive period of store 8. The output of the zero-crossing detector is also fed by a line 17 to the gate 11 for sampling the reading of the amplitude comparator 10, the length of the zero crossing pulse being made equal to approximately $\frac{3}{2}$ times the charging time factor of the final bi-directional store 12 to keep gate 11 open for a time sufficient for the transfer of the charge from amplitude comparator 10 to store 12. Finally the output of zero-crossing detector 14 is fed with a time delay of about twice the response-time factor of store 12, provided by a time-delay device 18, to the first peak-level store 8 to clear the latter prior to the sampling of the initial portion of the next-following waveform.

The sequence of operations of the various stores is indicated in the lower half of FIGURE 2, in which the zero-crossing points of the unrectified waveform curve are indicated at 0. At each point 0 both gates 7 and 11 open, and at each point $g$ gate 11 closes to terminate the transfer from the amplitude comparator 10 to the final bi-directional store 12 that controls the local-carrier oscillator 3. At $h$ the sampling gate 7 for the initial portion of the waveform closes, so that in effect the unidirectional store 8 will sample the maximum (rectified) voltage occurring in the period between points $g$ and $h$. Considering now the sequence of events at the zero-crossing 0 preceding the waveform comprising the peak $e$, it will be seen that at the next following point $i$ the unidirectional store 8 is cleared. At this time the gate 7 is open, so that the unidirectional store 8 will now be charged to the maximum voltage occurring during the remainder of its opening period, which terminates at point $h$, so that store 8 will then carry a voltage corresponding to amplitude $e$. The store 9, which is likewise a unidirectional store, will also be charged during this time to amplitude $e$ but will not be closed at time $h$, so that due to its short time factor, the effect of this charge will be negligible at the next zero-crossing point 0. The store 9 will however be recharged when at any subsequent time the waveform voltage is higher than its residual voltage. In the case of the illustrated waveform, the voltage charge of this store at the next following opening of gate 11 will be substantially equal to the relatively low value $e2$, while the gate-controlled store 8 will at that time still be charged to the higher voltage corresponding to the ear $e$. As a result the amplitude comparator 10 will produce a directional voltage corresponding to $e-e2$, which in the illustrated example is a positive value but would be a negative value if the phase displacement between the original and re-inserted carrier waveforms were in the opposite direction to that assumed. In this case the ear would appear ar $e2$ and therefore the voltage at $e2$ would be higher than that at $e$. The bi-directional store 12 will thus be set to a voltage corresponding in value and polarity to $e-e2$ and will effect, via line 13, a corresponding adjustment in the frequency of the local carrier oscillator 3. This charge of the bi-directional store 12 will be substantially maintained during the next-following waveform, in which the waveform voltage passes through the portion containing the negative peak $f$. After the next zero passage following peak $f$ and the completion of the transfer to store 12 at point $g$, the gate controlled peak-level store 8 is cleared at point $i$ via a time delay device 18. In the illustrated example the next following waveform, i.e. that containing peak $f$, is negative-going, but a corresponding positive-going waveform is produced by the full wave rectifier 6 so that a positive value $f^1$ corresponding to the first negative peak $f$ will be sampled in store 8, while the charge at store 9 will, at the next sampling of the comparator 10 via gate 11, i.e., between the next following points 0 and $g$, be subtsantially equal to the positive value $f3^1$ corresponding to the last negative-going peak $f3$ of the waveform in question, so that during the subseqent sampling time the store 12 will be set to a value dependent on $f^1-f3^1$ which, in the illustrated example, is again negative. The waveform between the two following zero crossings correspond only to a single digit, and has therefore in view of the assumed waveband limitation to $1/\tau$ only a single peak $c$, which will appear in both stores 8 and 9 so that the next operation of gate 11 will transfer to the store 12 a charge corresponding to zero error, but a transfer of a charge appropriate to the existing phase error will take place whenever two or more positive-going digits or two or more negative-going digits follow each other without an intermediate zero crossing.

In order to provide an additional gating operation to prevent the transfer to the final store 12 of the spurious zero-error output of the amplitude comparator 10, the gate 11 is provided with an inhibit terminal which is connected to the output of an inhibit-pulse generator 20 to which the output of the zero-crossing detector 14 is fed via a time-delay device 19 providing a time delay somewhat greater than the length of the opening period of gate 11. The device 20 produces inhibit pulses of a duration slightly longer than the single pulse period $\tau$, for example of a duration $1.2\tau$. Referring to the time diagram of FIGURE 2, the inhibit period starts substantially at point $g$ after each zero crossing and extends to point $j$, and it will be seen that the inhibit period following the zero crossing after waveform $d$ overlaps points 0, $g$ and $i$ at the zero crossing following maximum $a^1$ thus preventing the opening of gate 11 which otherwise would transmit this spurious zero output of the amplitude comparator at the end of the waveform containing the maximum $a^1$.

The invention is believed to be applicable to single-sideband phase-shift transmission even when operating at very high carrier frequency. It is not limited to all the details of the embodiment described.

Thus the means providing an additional gating operation that prevents the transfer to the final store 12 after a single pulse waveform and thus avoids the undesired effect of a spurious zero-error signal upon the frequency adjustment, may be omitted if desired, thus simplifying the apparatus, since such spurious signals can only slow down but never reverses the phase adjustment effect of the invention.

An alternative system according to the invention, of which an embodiment will now be described with reference to FIGURES 3 and 4, achieves the comparison of the maximum amplitudes at the beginning and end of each waveform without the need to employ peak-level stores and thus can have a relatively simple circuit. The input, local oscillator, and mixer of this embodiment do not differ from those employed in the embodiment of FIGURE 1 and have therefore been indicated by the same references. Instead, however, of employing triggered peak level stores of different decay times, the mixer output is fed to a two-part delay line 22, 23 each of the series connected parts of which produce a delay equal to $\tau/2$, $\tau$ being the length of the single pulse period. At the same time the mixer output is supplied to a full-wave rectifier 21, and the output of the delay line 22, 23, that is to say the waveform delayed by the pulse period $\tau$, is fed to a second full-wave rectifier 24 of opposite polarity. The outputs of the two rectifiers 21 and 24 are fed to an addition network 25, the output of which in turn is fed to a bi-directional final store 28 of long decay time via a gate 26 which is triggered to open for a short length of time each time a zero crossing of the mixer output reaches a zero-crossing detector 27 which is connected to a point between the two parts 22 and 23 of the divided delay line, in other words the gate 26 is triggered one half of a single pulse period after the occurrence of a zero crossing in the undelayed waveform supplied to rectifier 21. It will be readily appreciated that the opening of gate 26 coincides with the first maximum of each waveform in the undelayed mixer output fed to rectifier 21, and to the last maximum of the last preceding waveform of the delayed mixer output reaching the fullwave rectifier 24, which has a time delay of a single pulse period, and since these two maxima are fed at the same time to the addition network 25 with opposed polarities, the output passing through gate 26 will correspond in sign and magnitude to the difference between the first and last maxima of the waveforms produced at the time. The effect has been illustrated in FIGURE 4, which shows above the horizontal abscissa, the undelayed waveform of FIGURE 2 after full-wave rectification, while below the abscissa the same waveform is represented with its sign inverted and delayed by a single pulse period $\tau$, the sampling points being indicated by vertical lines displaced by $\tau/2$ from each zero crossing point of the undelayed waveform, while the output of additional network 25 at the sampling time is represented by the circled point on each of these vertical lines.

It will be observed that when the ear is at the beginning of each plural-period waveform, as in the illustrated example, a spurious zero reading will appear one half pulse period after the zero crossing following a single-pulse waveform, but as in the preceding embodiment, such spurious zero readings will only delay, or interrupt temporarily, the adjustment process of the local oscillator by the output from the bi-directional store 28 via control line 13 but cannot cause adjustment in the wrong sense. Even this inference may be minimised by the use of inhibit means responsive to the difference between the voltage at the output of gate 26 and the voltage stored in the bi-directional store 28, since in normal operation this difference should always be small, while in the case of a spurious zero reading the difference may be substantial.

What we claim is:

1. A receiver for the suppressed-carrier single-sideband transmission of continuous signals in digital code, which includes means for inserting a substitute carrier into the received waveform, said means including a local oscillator which comprises means responsive to the occurrence and position of a peak-voltage maximum positioned asymmetrically between successive zero crossings, of the output waveform and operative to automatically adjust the frequency of the said oscillator in such sense as to reduce the such asymmetric maximum.

2. Apparatus for the automatic adjustment of a local oscillator utilised for producing the reinserted carrier in a suppressed carrier single-sideband receiver for continuously transmitted signals in binary pulse code, comprising means for taking a peak-voltage sample over a short period of time in the region of the first voltage maximum occurring between successive zero crossings of the output waveform, slow decay first storage means for the samples thus taken, second storage means for taking and storing a peak-level sample in the region of the last voltage maximum occurring between successive zero crossings of the output waveform, and means responsive to the sample voltages thus obtained in the storage means at one point in each period determined by successive zero crossings and transmitting an output corresponding to at least the sign of the difference between the said voltages to a control means for the frequency of the local oscillator.

3. Apparatus as claimed in claim 2, wherein one of said samples is taken continuously during each waveform and stored in a store having a relatively short decay time so that at the time of the comparison the influence on this store of a peak-voltage maximum appearing at the time at which the other sample is taken is small compared with the influence of a peak-voltage maximum appearing near the time of comparison.

4. Apparatus as claimed in claim 2, including a full-wave rectifier for the waveform supplied to said responsive means.

5. Apparatus according to claim 2, including means controlled by each zero passage of the unrectified waveform and operative to prevent the transmission of the output to the frequency-control means after the next following zero crossing unless more than one single pulse period has lapsed before such further zero crossing.

6. In a receiver for the suppressed-carrier single-sideband transmission of continuously transmitted binary information, which includes means for inserting a substitute carrier into the received waveform, said means including a local oscillator, a system for the automatic adjustment of the local-oscillator frequency comprising a full-wave rectifier for the received waveform including the substitute carrier means for producing two replicas of the output of the full-wave rectifier, one of said replicas being delayed by one single-pulse period relative to the other, means for sampling the algebraic momentary difference between the two replicas at points delayed relative to the zero crossings of the earlier replica by one half single-pulse period, and means responsive to at least the sign of the difference at the time of each sampling to adjust the frequency of the local oscillator in such a direction as to reduce the phase difference, indicated by the difference, between the suppressed carrier and the substitute carrier.

7. In a receiver for the suppressed-carrier single-sideband transmission of continuous signals in digital code, which includes means for inserting a substitute carrier into the received waveform, said means including a local oscillator, the combination comprising means responsive to the occurrence and position of the two nearest peak-voltage maxima respectively situated before and after a zero crossing of the output waveform and operative to automatically adjust the frequency of the said oscillator in such sense as to reduce the asymmetry of said maxima.

8. Apparatus as claimed in claim 7, including a full-wave rectifier for the waveform supplied to the said responsive means.

No references cited.

DAVID G. REDINBAUGH, *Primary Examiner.*